(12) United States Patent
Tusavitz (10) Patent No.: US 7,090,187 B2
(45) Date of Patent: Aug. 15, 2006

(54) ADJUSTABLE DISPLAY BASE

(76) Inventor: Daniel J. Tusavitz, 123 Merion Dr., Limerick, PA (US) 19468

( * ) Notice: Subject to any disclaimer, the term of this patent is extended or adjusted under 35 U.S.C. 154(b) by 0 days.

(21) Appl. No.: 10/618,131

(22) Filed: Jul. 11, 2003

(65) Prior Publication Data

US 2004/0084595 A1    May 6, 2004

Related U.S. Application Data (60) Provisional application No. 60/396,685, filed on Jul. 18, 2002.

(51) Int. Cl.
*B65D 19/00* (2006.01)
*B62B 3/02* (2006.01)

(52) U.S. Cl. .................... 248/346.07; 248/346.06; 280/35

(58) Field of Classification Search .......... 248/346.07, 248/346.03, 346.01, 346.02, 346.06; 280/35, 280/79.11, 79.3, 79.8, 638
See application file for complete search history.

(56) References Cited

U.S. PATENT DOCUMENTS

| | | | | |
|---|---|---|---|---|
| 211,828 A | * | 2/1879 | Ash ........................... 280/35 |
| 3,331,613 A | * | 7/1967 | Popelka ....................... 280/35 |
| 4,700,959 A | * | 10/1987 | Lars ......................... 280/79.11 |
| 5,299,817 A | | 4/1994 | Chang | |
| 5,599,031 A | | 2/1997 | Hodges | |
| 5,797,213 A | * | 8/1998 | Frick ........................... 43/54.1 |
| 5,826,893 A | * | 10/1998 | Snoeyenbos ................. 280/43 |
| D415,868 S | * | 10/1999 | Hewitt ....................... D34/23 |
| 6,095,533 A | * | 8/2000 | Balolia ......................... 280/35 |
| 2004/0084595 A1 | * | 5/2004 | Tusavitz ................. 248/346.07 |

* cited by examiner

*Primary Examiner*—Anita King
*Assistant Examiner*—Tan Le
(74) *Attorney, Agent, or Firm*—RatnerPrestia

(57) ABSTRACT

An adjustable display base primarily for use in retail stores such as supermarkets to hold merchandise. The adjustable display base includes four equal frame members, located at the corners of the device, that support the merchandise. The base can expand at least in the x- and y-directions to accommodate merchandise of various sizes. A system of telescoping dowels and legs permits such expansion. Expansion in the z-direction is also possible. A removable center plate, supported by the frame members, provides a flat surface in the horizontal (x-y) plane for supporting merchandise. The display base is mobile, permitting the merchandise to be moved easily without having to remove the merchandise from the base. Casters enable such movement of the display base.

7 Claims, 7 Drawing Sheets

ADJUSTABLE DISPLAY BASE

RELATED APPLICATION

This application claims the benefit of priority to U.S. Provisional Patent Application No. 60/396,685, filed on Jul. 18, 2002, the contents of which are incorporated in this application by reference.

TECHNICAL FIELD

The present invention relates generally to merchandise displays and, more particularly, to an adjustable display base comprising a support frame that can be adjusted at least in the x-y plane to display merchandise in retail stores. The invention is of particular use in supermarkets to display various products resting on a base, while providing a mobile and easily transportable display base.

BACKGROUND OF THE INVENTION

Traditional product displays in retail stores are stationary. This presents a problem when the area below the display needs to be cleaned because the displays are difficult to move without disassembly. Bulk or packaged merchandise is typically stacked on the floor, leaving a ring of dirt in an area when the merchandise is relocated, because the stacks could not be moved when the surrounding area was being cleaned. It is cumbersome to maneuver around the product area.

The field of dollies or carriers for supporting equipment suggests a mobile display. U.S. Pat. No. 5,599,031, for example, discloses a work dolly adjustable in width, length, and height, and which can distribute applied loads through supporting structure and wheeled support to the ground. Thus, the dolly can support loads of substantial weight and of varying configuration. The dolly includes a substantially rectangular frame comprising adjustable end pieces and adjustable side pieces connected together at their opposite ends. A wheeled support is provided at each juncture of the end members and the side members so that a wheeled construction is provided. Adjustable legs are provided at each juncture of the end members and side members so that the height may be adjusted to accommodate a variety of configured loads. Detachable fasteners are used to place the adjusted end members and side members in a discrete, selected location as well as the legs in a discrete, selected height position. The end members and side members are composed of apertured members of square cross-section and are arranged in telescoping relationship between inserted sections so that adjustment can be provided.

Another example of an adjustable mobile base for equipment and machinery is provided by U.S. Pat. No. 5,299,817. The base includes a closed loop frame which has a plurality of angled members and a plurality of tubular connectors interconnecting the angled members. Each of the angled members is formed with a corner and has two tube sections. Each of the tube sections has a pair of opposing side walls formed with a plurality of discrete, spaced first through holes which extend in the direction of a longitudinal axis of the tube section. Each of the angled members further has a triangular support plate secured on the corner for supporting the machine. Each of the tubular connectors has two ends slidably inserted into a respective one of the tube sections of the angled members. Each of the tubular connectors further has a pair of opposing side walls formed with a plurality of discrete, spaced second through holes which are aligned with the first engaging through holes. A plurality of locking bolt units respectively extend through the aligned first and second through holes so as to join the tubular connectors and the angled members. Adjustment of the size of the mobile base is achieved by varying the degree of insertion of the tube connectors in the tube sections of the angled members, thereby permitting the mobile base to fit machines of different sizes.

Such adjustable mobile bases have a number of drawbacks that render them disadvantageous for use as product displays in retail stores such as supermarkets. Two of these drawbacks are highlighted. First, the bases require time consuming and difficult alignment of through holes, as well as insertion and removal of fasteners into and from the aligned through holes, to render the bases adjustable. Second, the frames of the bases define open loops, surrounding a large, central area which does not support the equipment or machinery. This open central area renders the bases unsuitable for stacking many products displayed in retail establishments.

To overcome the shortcomings of traditional supermarket displays, the present invention relates to a new display base. The present invention is lightweight and can support merchandise of varying dimensions and weight. An object of the present invention is to provide an improved base that is easily adjustable in at least four directions. A related object of the invention is a frame that provides suitable support for the merchandise being displayed or transported through a store.

Unlike traditional supermarket display bases fixed in one position, the adjustable display base can be rotationally positioned. It is still another object of the present invention to expand, allowing for repositioning of displays without disassembling them.

SUMMARY OF THE INVENTION

To achieve these and other objects, and in view of its purposes, the present invention provides a mobile display base that can be adjusted to fit the size of the merchandise resting upon it. The display base is adjustable in at least four directions, moving throughout the x-y plane, and may optionally be adjustable upward and downward in the z-plane. The base conforms to any rectangular or square measurement within its expandable range, limited only by the dimensions of the components used to construct the device.

The base is comprised of four identical quarter deck pieces which form the corners of the frame. The deck pieces are shaped to align with and abut each other when the base is in a completely closed position. The deck pieces expand through the provision of dowels slidably received in a series of legs. The legs project from a set of shoulders to enclose the dowels. The legs and dowels together act as the structural system enabling expansion in four directions, throughout the x-y plane. Slots are cut in the legs to ensure that the base can expand beyond the closed position. Projections such as screws or pins are placed into the slots to attach the dowels to the legs. The base readily expands in both the x- and y-directions while maintaining uniform structural support.

The stems of casters connect the deck pieces to the shoulders. The casters have wheels which rotate to provide movement of the base while keeping the adjustable display base in constant contact with the floor. The casters are attached to the shoulders by placing the stem of a caster through a respective elbow of a shoulder and securing the stem with a fastener above a deck piece. Braces may be secured between the legs.

A further component of the invention includes a pull mechanism to transport the adjustable display base. The pull mechanism can be attached to the corner of one of the shoulders. A yet further component of the invention includes one or more center support elements. A center support element can take the form of a flat center plate which can be remotely attached to the base unit by a tether or slideably attached to the base unit to permit expansion of the base unit. Another embodiment of the present invention includes a lip along each of the corners of the deck pieces to support any merchandise resting on the display base and prevent such merchandise from falling off the base. The lip may be adjustable in the z-direction.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
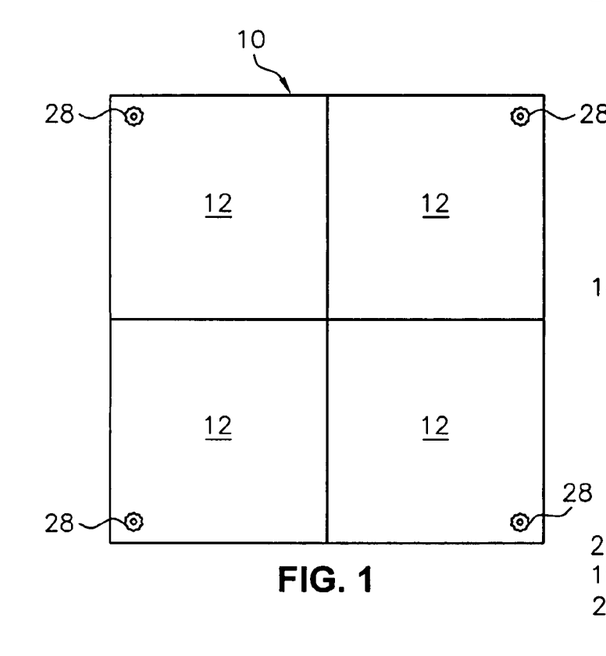
FIG. 1 is a top view of the adjustable display base according to the present invention shown in a closed position.

Referring to the figures, in which like reference numbers refer to like elements throughout the various figures that comprise the drawing, FIG. 1 shows the adjustable display base 10 comprised of four identical quarter deck pieces 12 forming equal corners of the base 10. The deck pieces 12 are shaped to perpendicularly align and abut when the base 10 is in a closed position. FIG. 1 illustrates the closed position.

Figure 2:
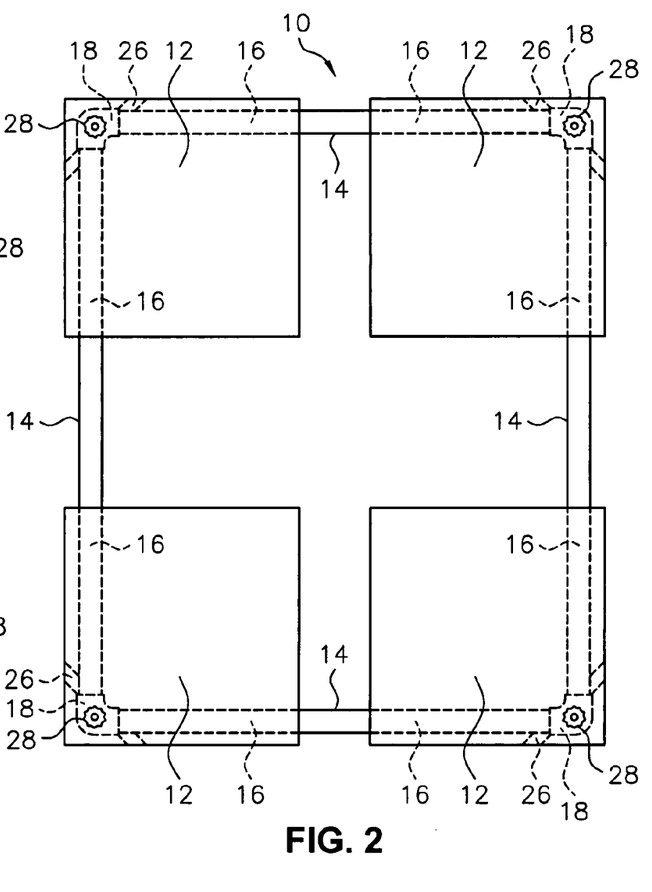
FIG. 2 is a top view of the adjustable display base illustrated in FIG. 1 shown in an open, expanded position.

Referring to FIG. 2, the deck pieces 12 are shown in an expanded position, depicting the structural support members and connecting members of the base 10. Tubular legs 16 are permanently affixed to and project from shoulders 18. Four shoulders 18 are provided, one shoulder 18 positioned at each of the four corners of the base 10. Eight legs 16 are provided. Two legs 16 project from each shoulder 18, one leg 16 from each of the two ends of a shoulder 18.

The legs 16 slidably enclose dowels 14 which form the four sides of the base 10. The legs 16 slide along the dowels 14 in a telescoping fashion to close and expand the base 10 as needed to accommodate merchandise of different sizes. Thus, as illustrated in FIG. 1 in the closed position, adjacent legs 16 abut or nearly abut to substantially enclose the dowels 14 completely. To attain one of the multiple possible expanded positions, as shown in FIG. 2, the user slides the legs 16 along the dowels 14 until the desired spacing of the deck pieces 12 is obtained.

Figure 6:
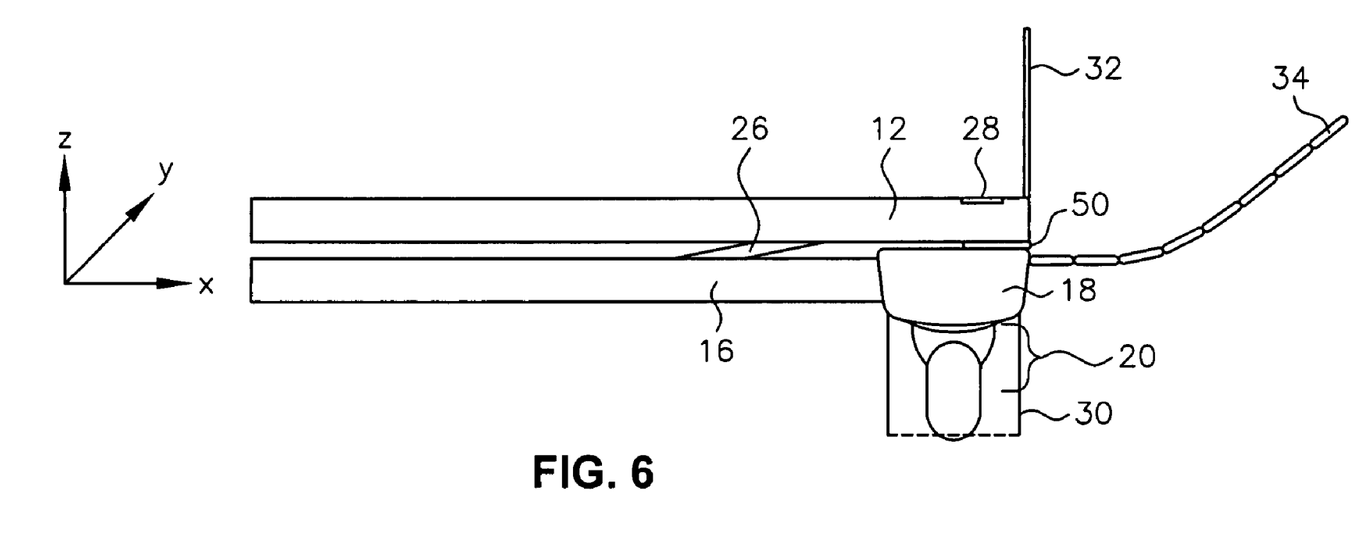
FIG. 6 is a side view of the display base with additional, optional components illustrated.

The deck pieces 12 may be made of wood, metal, plastic, or other suitable material having sufficient strength and rigidity to support merchandise. The legs 16 are preferably formed of rigid polyvinyl chloride (PVC). PVC enables a smooth sliding action with minimal friction between the legs 16 and the dowels 14. Like the deck pieces, the dowels 14 may be made of wood, metal, plastic, or other suitable material having sufficient strength and rigidity to support heavy merchandise. Also like the deck pieces, the shoulders 18 may be made of wood, metal, plastic, or other suitable material having sufficient strength and rigidity to support heavy merchandise. Like the legs 16, the shoulders 18 may also be made of rigid PVC. In fact, the shoulders 18 and the legs 16 may be constructed together as an integral, monolithic, single unit rather than as the multi-piece structures illustrated. A single, molded unit is contemplated. The dowels 14, legs 16, and shoulders 18 together act as the structural system enabling expansion of the base 10 in four directions (i.e., in the positive and negative x- and y-directions) in the x-y plane. FIG. 6 includes an x-y-z coordinate system in relation to the base 10 as a frame of reference.

Figure 3:
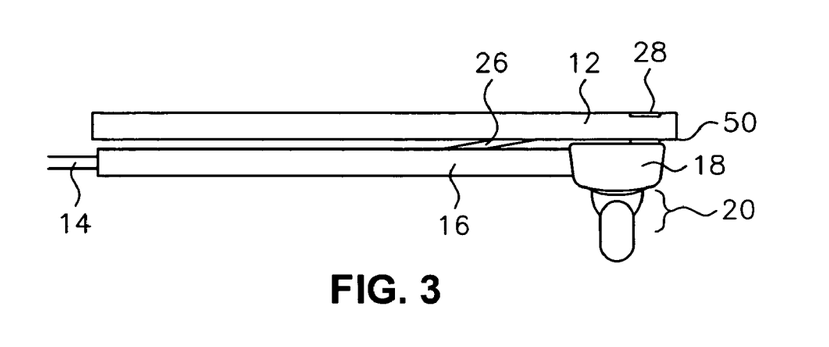
FIG. 3 is a side view of one corner of the adjustable display base.

As illustrated in FIG. 3, a caster 20 is provided at each of the four corners of the base 10. Each of the four casters 20 comprises a stem and a small wheel on a swivel. One of the casters 20 is attached to one of the shoulders 18 by placing the stem of the caster 20 through a hole in the elbow of the shoulder 18. A washer 50 may be provided around the stem of the caster 20 and between the top of the shoulder 18 and the bottom of the deck piece 12 to better seat the deck piece 12 on the shoulder 18.

The stem of the caster 20 further extends through a hole in the deck piece 12 supported on the shoulder 18 and is secured to the deck piece 12 (and, therefore, to the shoulder 18) by a fastener 28 (e.g., a clamp, nut, hold down, lock, or the like). The fastener 28 is preferably recessed within a seat at the top of the hole in the deck piece 12 so that the deck pieces 12 combine to provide a flat surface for receiving merchandise; no components extend above the top plane formed by the four deck pieces 12 within the area of the support surface. Thus, the casters 20 are attached to the base 10 with the wheels of the casters 20 extending under the base 10. The wheels of the casters 20 rotate to facilitate movement of the base 10 while supporting the base 10 on and in contact with a floor. A lock or brake (not shown) may be provided to engage the wheels and prevent movement of the base 10 as desired.

Figure 4:
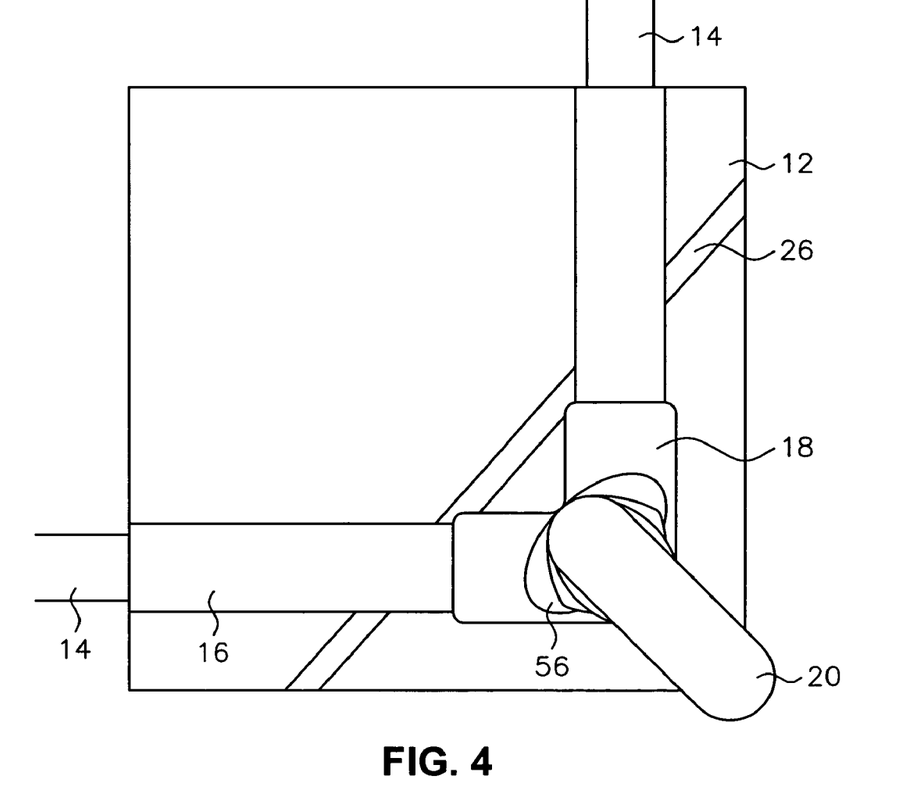
FIG. 4 is a bottom view of one corner of the adjustable display base.

FIG. 4 is a bottom view of one corner of the adjustable display base. As illustrated in FIG. 4, a component such as a T-nut fastener may be added as a caster socket 56. The function of this component is to add strength to the device, offering reinforcement.

Each deck piece 12 rests on a respective shoulder 18 and on the two legs 16 which extend from that shoulder 18. To assure maximum support of the deck pieces 12 (and, in turn, the merchandise resting upon the deck pieces 12), the legs 16 extend to and terminate at approximately the outer edges of the deck pieces 12. This configuration also assures that the deck pieces can substantially abut, without interference by adjacent legs 16, when the base 10 is in the closed position. The substantially coextensive extent of the legs 16 and the deck pieces 12 is illustrated in FIGS. 2–6.

A set of four braces 26 may optionally be provided on base 10. The braces 26 serve at least two functions. First, the braces 26 further support and provide rigidity to the respective deck pieces 12 to which the braces 26 are attached. Second, at least when the shoulders 18 and the legs 16 are not formed as an integral component, the braces 26 extend across the two legs 16 which engage a shoulder 18 and have a width equal to the height that the top of the shoulder 18 extends above the tops of the legs 16. Thus, the braces 26 and the top of the shoulder 18 form a level plane supporting the deck piece 12. To serve their functions, the braces 26 may be made of wood, metal, plastic, or other suitable material having sufficient strength and rigidity to support heavy merchandise. The braces 26 are attached to the underside of the deck pieces 12 in any conventional manner, such as via glue, fasteners, or the like.

Figure 5:
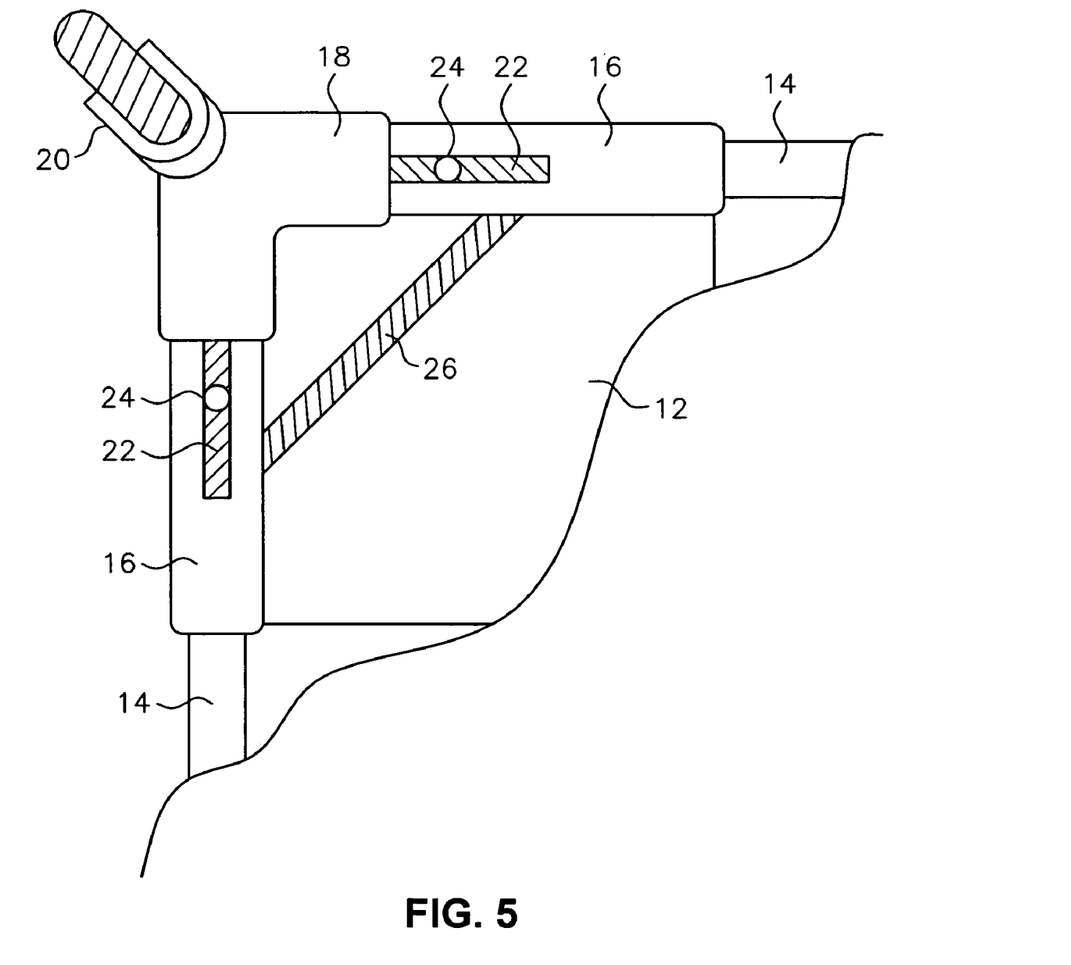
FIG. 5 is a bottom perspective view of one corner of the adjustable display base.

Exemplary components that facilitate the telescoping engagement between the legs 16 and the dowels 14 are illustrated in FIG. 5. Slots 22 are cut in the legs 16 to form a channel in each leg 16. A screw, thumbscrew, nail, pin, rivet, or other projection 24 is affixed to the dowel 14. For example, a thumbscrew may be seated in a metal insert placed in the dowel 14. A sealing washer made of polychloroprene (available under the trademark Neoprene® from E. I. DuPont deNemours & Co., Inc. of Wilmington, Del.) may be used with the thumbscrew to provide a locking mechanism.

The projection 24 extends outwardly from the dowel 14 and is held in the slot 22. As the legs 16 slide along the dowels 14, the projections 24 slide along the slots 22. Unlike conventional telescoping structures, which offer discrete alignment holes and, therefore, discrete stopping points at which the telescoping components may be affixed, the combination of projections 24 and slots 22 of the present invention provides a continuum of potentially infinite affixed positions. Thus, the present invention provides a continuously adjustable securing mechanism for reversibly locking the telescoping mechanism into a predetermined position defining a specific length and width sized to accommodate merchandise to be supported by the base 10. When the projections 24 reach the ends of the slots 22, further sliding of the legs 16 relative to the dowels 14 is prevented. Therefore, the legs 16 cannot slide completely off the dowels 14; separation of the base 10 is prevented.

Figure 11:
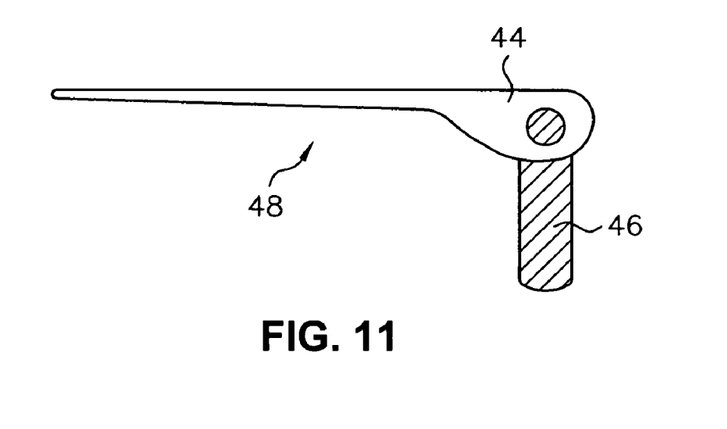
FIG. 11 is a side view of one contemplated projection.
Figure 12:
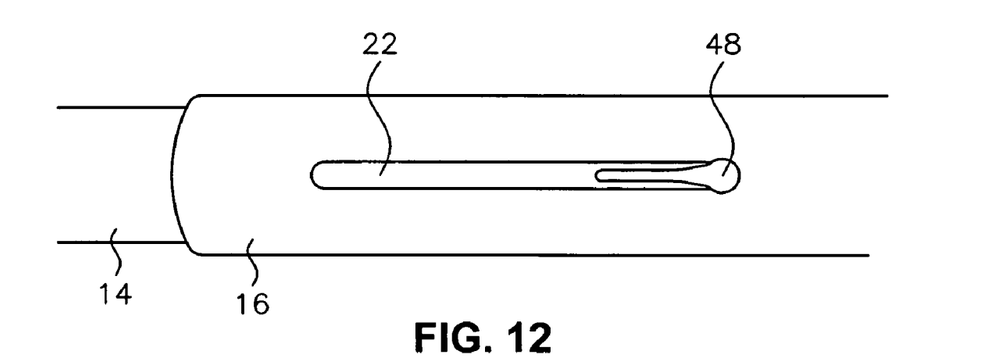
FIG. 12 is a side view of the adjustable display base shown using the projection of FIG. 11.

Alternatively, in order to lock the dowel 14 relative to the leg 16, and prevent sliding motion, the projection 24 may be a catch such as, but not limited to, a cam lever assembly 48 comprising a quick-release cam lever 44 pivotally attached to a screw 46 or other fastener. Such exemplary components are illustrated in FIG. 11. FIG. 12 is a side view of the base 10 shown using the projection 24 of FIG. 11.

Further components of the invention are depicted in FIG. 6. First, a pull mechanism 34 may be provided to facilitate transportation of the adjustable display base 10 by a user. The pull mechanism 34 can be attached to the corner of one of the shoulders 18; alternative attachment points are possible. Second, shields 30 may be provided around the wheels of the casters 20. The shields 30 function to improve the aesthetics of the base 10 and to protect the casters 20. Third, the top surface of the deck pieces 12 can be provided with a sticky or tacky substance, or can be ribbed or corrugated, to better retain merchandise on that surface.

Finally, a lip 32 may be provided along the edge of each of the deck pieces 12. The lip 32 functions to support any merchandise resting on the display base 10 and prevent such merchandise from falling off the base 10, especially during movement of the base 10. The lip 32 may be adjusted in the vertical or z-direction. Thus, the lip 32 may be raised or lowered to accommodate merchandise of various heights.

Figure 7:
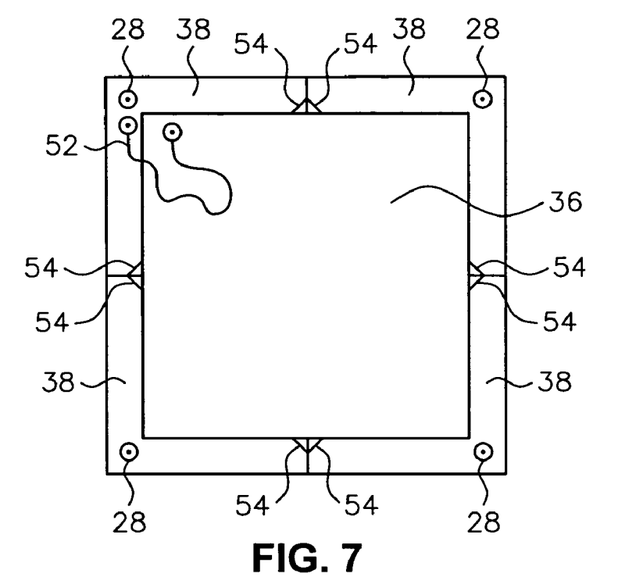
FIG. 7 is a top view of another embodiment of the adjustable display base of the present invention shown in the closed position.

FIG. 7 illustrates one preferred embodiment of the present invention in the closed position. The base 10 is further provided with a center plate 36 and an L-shaped member 50 attached to each corner. The center plate 36 and each L-shaped member 38 are approximately flush to provide a flat surface for supporting merchandise. In the closed position, the center plate 36 also performs an ornamental feature by giving a smooth, aesthetically pleasing appearance to the base 10 when viewed from above. The center plate 36 may be affixed to the base 10 by a tether 52 to maintain the invention as a single unit for handling or storage purposes. Optional omission of a portion of the interior corner on each of the L-shape members 38 facilitates finger removal of the center plate 36 from the base unit 10. As illustrated in FIG. 7, such omission creates a chamfer 54.

Figure 8:
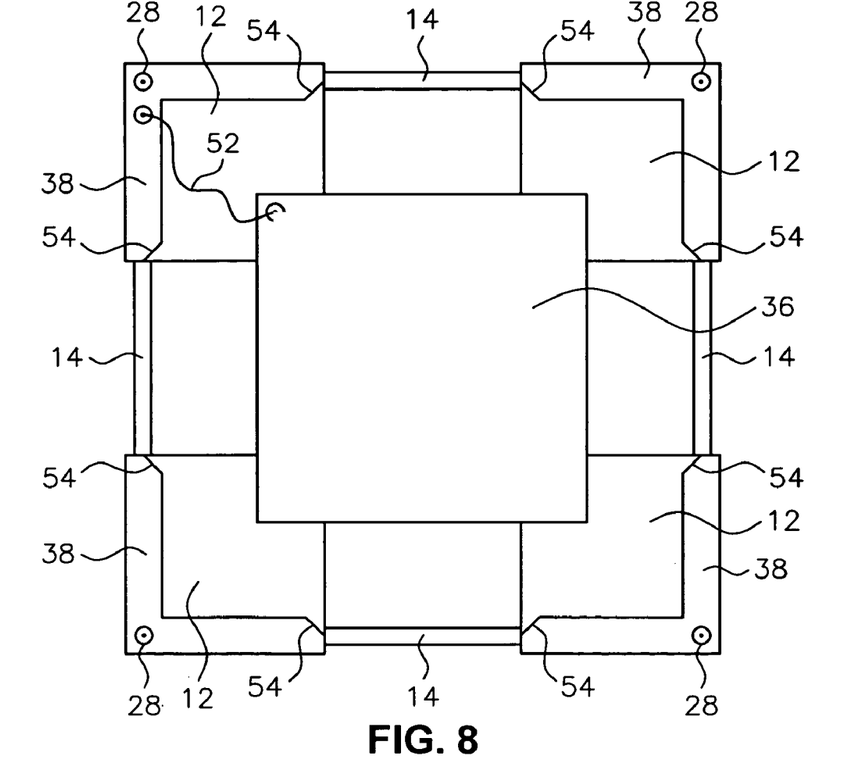
FIG. 8 is a top view of the same embodiment depicted in FIG. 7 but shown in the open position.

Referring to FIG. 8, the preferred embodiment depicted in FIG. 7 is shown in an expanded position. From this view it can be appreciated that, when the base 10 is in the expanded position, the center plate 36 provides an increased interior surface area to support more securely a plurality of adjacent merchandise in contact with and supported by the base 10. Therefore, especially in combination with the deck pieces 12, the center plate 36 offers advantages typically absent from conventional dollies in which an outer frame defines an open center area.

Figure 9:
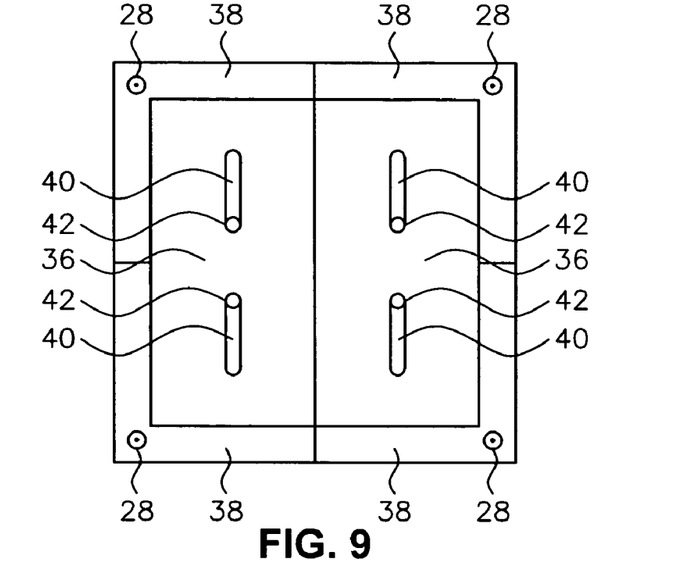
FIG. 9 is a top view of another embodiment of the adjustable display base of the present invention shown in the closed position.

FIG. 9 illustrates another preferred embodiment of the present invention in the closed position. The base 10 is further provided with a center plate 36 having sections and an L-shaped member 38 attached to each corner. The embodiment shown in FIG. 9 further provides channels 40 and reversible connecting devices 42 (i.e., fasteners) on the plurality of sections that form center plate 36. Each section of the center plate 36 is connected to two abutting deck pieces 12 by the reversible connecting devices 42 positioned in the channels 40. The reversible connecting devices 42 may pass through holes in the deck pieces 12. The result is a telescoping system that permits expansion of the base 10 in a first direction to the limit of the channels 40 and in a second direction to the limit of the slots 22.

Figure 10:
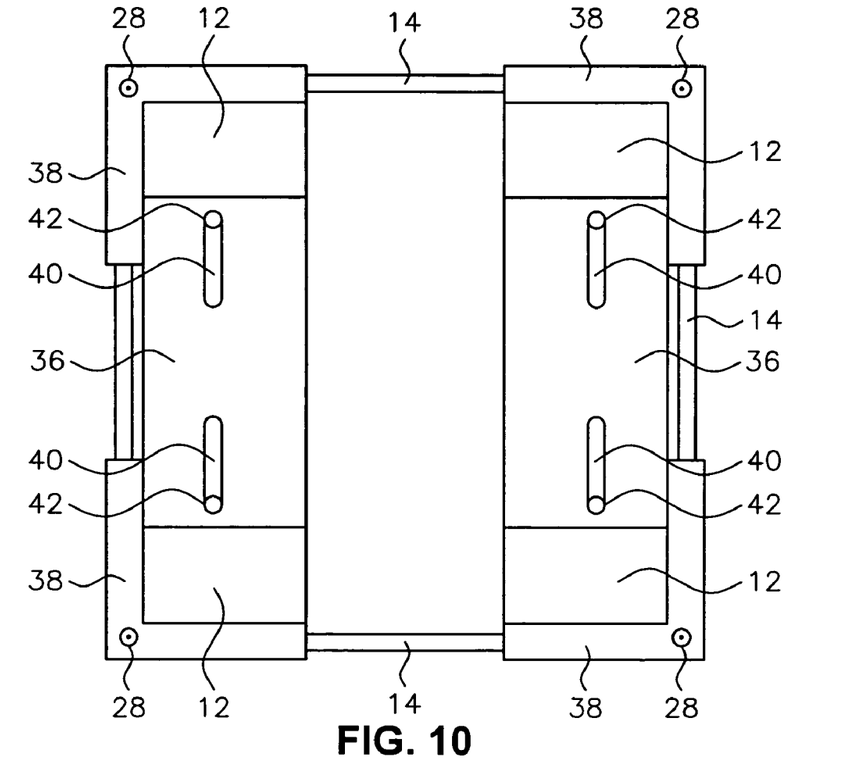
FIG. 10 is a top view of the same embodiment depicted in FIG. 9 but shown in the open position.

Referring to FIG. 10, the preferred embodiment depicted in FIG. 9 is shown in an expanded position. From this view it can be appreciated that, when the base 10 is in the expanded position, the sections of the center plate 36 provide an increased interior surface area to support more securely a plurality of adjacent merchandise in contact with and supported by the base 10.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention.

Certain ornamental additions, such as colored wheels, painted legs, and the like, for example, are contemplated. The present invention provides an adjustable, moveable, relatively light weight support for the merchandise displayed for sale in various retail stores.

What is claimed is:

1. An adjustable base for displaying merchandise, the base comprising:
    a set of movable deck pieces each forming a corner of the base, having an outer edge, and providing a flat surface for supporting merchandise, wherein at least two of said deck pieces substantially abut when the base is in a closed position;
    a shoulder positioned at each corner of the base under and in support of a respective deck piece, each shoulder having opposing ends;
    a tubular leg extending from each of the opposing ends of each shoulder to the outer edge of the respective deck piece, further supporting the deck piece, and having a single extended slot;
    a dowel slidably received in each leg, each dowel having a projection engaging the slot of the leg in which the dowel is received; and
    a caster rotatably attached to each shoulder facilitating transportation of the base.

2. The base of claim 1 wherein the projection comprises a threaded fastener reversibly tightened to secure the dowel to the tubular leg.

3. The base of claim 1 further comprising a removable center plate disposed above and supported by the deck pieces, the center plate providing a flat surface in a horizontal (x-y) plane for supporting merchandise.

4. The base of claim 3 further comprising a tether having two ends with the center plate attached to one end of the tether and the other end of the tether attached to another component of the base.

5. The base of claim 3 wherein the center plate comprises at least two sections slideably attached to the deck pieces.

6. The base of claim 1, wherein said deck pieces are shaped to perpendicularly align and abut when the base is in the closed position.

7. An adjustable base for displaying merchandise, the base comprising:
    a set of movable deck pieces each forming a corner of the base, having an outer edge, and providing a flat surface for supporting merchandise;
    a shoulder positioned at each corner of the base under and in support of a respective deck piece, each shoulder having opposing ends;
    a tubular leg extending from each of the opposing ends of each shoulder to the outer edge of the respective deck piece, further supporting the deck piece, and having a single extended slot;
    a dowel slidably received in each leg, each dowel having a projection engaging the slot of the leg in which the dowel is received; and
    a caster rotatably attached to each shoulder facilitating transportation of the base;
    wherein the projection comprises a threaded fastener reversibly tightened to secure the dowel to the tubular leg; and
    wherein the projection further comprises a quick-release cam lever, the cam lever pivotally attached to the threaded fastener and reversibly closed to secure the dowel to the tubular leg.

* * * * *